Mar. 3, 1925.  1,528,675
T. H. LIBBEY
VALVE TAPPET
Filed Jan. 20, 1923
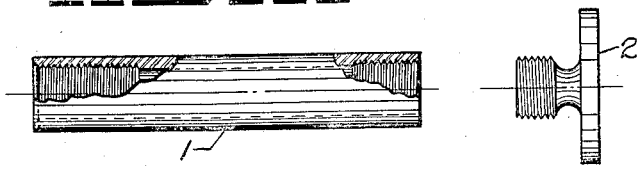
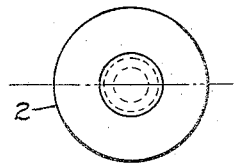
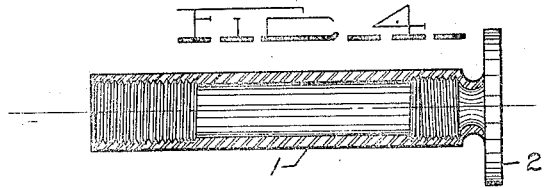
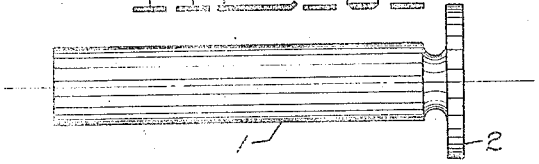
INVENTOR
T. HERBERT LIBBEY
BY
William MacGlashan
ATTORNEY Patented Mar. 3, 1925.

1,528,675

UNITED STATES PATENT OFFICE.

THOMAS HERBERT LIBBEY, OF DETROIT, MICHIGAN, ASSIGNOR TO THE STUDEBAKER CORPORATION, A CORPORATION OF NEW JERSEY.

VALVE TAPPET.

Application filed January 20, 1923. Serial No. 614,050.

*To all whom it may concern:*

Be it known that I, THOMAS HERBERT LIBBEY, a citizen of the United States of America, and resident of Detroit, in the county of Wayne and State of Michigan, have invented certain new and useful Improvements in Valve Tappets, of which the following is a specification.

This invention relates to valve tappets of the mushroom type and the object is to provide such a valve tappet that will be efficient in operation and economical to manufacture.

In valve tappets of this type it is desirable to have a relatively hard tappet face to withstand the rubbing action of the cam against it, and a tough, non-brittle shank to withstand the sudden and repeated stresses set up within the same due to the cam action against the face of the tappet.

Usually these tappets are made of one piece of material, or if made of more than one piece of material are secured together and in either case are hardened as a whole. This necessitates a degree of hardness which is a medium between the desired hardness of the tappet face and the shank, and therefore does not satisfy the ideal conditions.

My present invention provides a valve tappet in which the tappet face may be of any desired hardness entirely independent of the hardness of the shank, and which will cost a relatively small amount to produce. I accomplish this by making the tappet of two separate parts, a shank member, and a face member; the shank member being of a material that requires no hardening and the face member being hardened before assembling to the shank member, after which the two members are ground to size as a unit. Moreover, both the shank and face members may be produced from standard sizes of material on automatic screw machine; thus helping to reduce the cost of manufacturing considerably.

In the accompanying drawings which illustrate a suitable embodiment of my present invention.

Fig. 1 is a partially broken side view of the valve tappet shank member.

Fig. 2 is a side view of the valve tappet face member.

Fig. 3 is an end view of the member of Fig. 2.

Fig. 4 is a partially sectioned view of the members of Fig. 1 and Fig. 2 in assembled position, showing the manner in which they are secured together and Fig. 5 is a side view of the completed valve tappet.

1 is the tappet shank member and 2 is the tappet face member. The shank member 1 consists of a straight tubular member threaded internally at both ends. It is preferably made of cold drawn tubing of slightly larger diameter than the finished shank, the inside diameter being such that no machining is necessary to prepare it for being threaded. The tappet face 2 is preferably in the form of a disk having a relatively short axial stud projecting out from it, a circumferential groove being provided in the stud like projection adjacent the disk. This tappet face 2 is of such a construction that it may be completely machined in an automatic screw machine after which it is properly hardened. This leaves the shank member 1 not hardened and the face member 2 hardened. The stud like projection of the face member 2 is then screwed into the end of the shank member 1 until part of the shank member 1 projects over the circumferential groove in the stud like projection of the face member 2. This projecting part is then rolled into the groove, securely fastening the two pieces together as is shown in Fig. 4 and the valve tappet as a whole is ground to size.

Formal changes may be made in the specific embodiment of the invention described without departing from the spirit or substance of the broad idea, the scope of which is commensurate with the appended claims.

What I claim is:

1. A valve tappet comprising a hollow internally threaded shank member and a face member having a stud projecting therefrom and threaded in said shank member, said stud having a circumferential groove opposite its free end and held in said shank by a groove formed in said shank.

2. As an article of manufacture, a valve tappet composed of a tubular shank member threaded internally, and a disc shaped face member having a stud projecting axially therefrom; said stud having a circumferential groove opposite its free end; said shank member threaded onto said stud and having a portion rolled into said groove, substantially as described.

3. A valve tappet composed of a tubular shank member threaded internally, and a hardened face member provided with a stud projecting therefrom with a circumferential depression opposite its free end; said shank member threaded onto said stud and having a portion thereof rolled into said depression for locking said shank to said face member, substantially as described.

4. A valve tappet comprising a tubular shank member and a face member having a threaded projection thereon screw-threaded into said shank member, said projection having a portion of reduced area received in said shank and said shank being deformed into said reduced portion to prevent movement of said head relative to said shank.

5. A valve tappet composed of a tubular shank member and a hardened face member having an axial projection thereon; said axial projection having a circumferential groove therein adjacent its connected end; said members being secured together by screwing said projection into said tubular shank member and by causing a portion of shank member to be deformed into said groove.

Signed by me at Detroit, Michigan, U. S. A., this 11th day of Jan., 1923.

T. HERBERT LIBBEY.

Witnesses:
ELMER L. McINTYRE,
HODGSON S. PIERCE.